United States Patent
Gadre et al.

(10) Patent No.: US 11,409,757 B2
(45) Date of Patent: Aug. 9, 2022

(54) SYSTEM AND METHOD FOR COLLECTING, CONSOLIDATING AND PROCESSING DATA

(71) Applicant: HEXANIKA, New York, NY (US)

(72) Inventors: Makarand Gadre, Kirkland, WA (US); Yogesh Pandit, Haledon, NY (US)

(*) Notice: Subject to any disclaimer, the term of this patent is extended or adjusted under 35 U.S.C. 154(b) by 535 days.

(21) Appl. No.: 16/330,047

(22) PCT Filed: Aug. 2, 2017

(86) PCT No.: PCT/US2017/045127
§ 371 (c)(1),
(2) Date: Mar. 1, 2019

(87) PCT Pub. No.: WO2018/026933
PCT Pub. Date: Feb. 8, 2018

(65) Prior Publication Data
US 2019/0205309 A1    Jul. 4, 2019

Related U.S. Application Data

(60) Provisional application No. 62/370,050, filed on Aug. 2, 2016.

(51) Int. Cl.
*G06F 16/00*       (2019.01)
*G06F 16/25*       (2019.01)
(Continued)

(52) U.S. Cl.
CPC ........ *G06F 16/254* (2019.01); *G06F 16/2365* (2019.01); *G06F 16/258* (2019.01); *G06Q 10/10* (2013.01)

(58) Field of Classification Search
CPC .. G06F 16/2365; G06F 16/258; G06F 16/254; G06Q 10/10
See application file for complete search history.

(56) References Cited

U.S. PATENT DOCUMENTS

2006/0078863 A1* 4/2006 Coleman .................. G09B 7/02
                                                                    434/322
2006/0095372 A1    5/2006 Venkatasubramanian et al.
(Continued)

FOREIGN PATENT DOCUMENTS

JP    2011/159053    8/2011
JP    2012/252430    12/2012
(Continued)

OTHER PUBLICATIONS

Benkhelifa et al., "On a Real World Implementation of Advanced Authentication Mechanism in a Multi-Tenant Cloud Service Delivery Platform," 2014 5th International Conference on Information and Communication Systems (ICICS), pp. 1-6. (Year: 2014).*
(Continued)

*Primary Examiner* — Cheryl Lewis
(74) *Attorney, Agent, or Firm* — Thomas E. Williams; Neal, Gerber & Eisenberg LLP

(57) ABSTRACT

A method for collecting, consolidating and processing data is provided. The method includes receiving, using at least one of said at least one processor, data via a plurality of data streams, aggregating, using at least one of said at least one processor, data received via the plurality of data streams, validating, using at least one of said at least one processor, the received data, and transforming, using at least one of said at least one processor, the received data into standardized data formats.

14 Claims, 7 Drawing Sheets

(51) Int. Cl.
  *G06Q 10/10* (2012.01)
  *G06F 16/23* (2019.01)

(56) References Cited

U.S. PATENT DOCUMENTS

| | | | |
|---|---|---|---|
| 2006/0235714 | A1 | 10/2006 | Adinolfi et al. |
| 2017/0200234 | A1* | 7/2017 | Morse ................ G06F 3/0482 |
| 2019/0130495 | A1* | 5/2019 | Guzman .............. G06F 16/24 |

FOREIGN PATENT DOCUMENTS

| | | |
|---|---|---|
| WO | 2006/060105 | 6/2006 |
| WO | 2018/026933 | 2/2018 |

OTHER PUBLICATIONS

Korean Intellectual Property Office, International Search Report in International Application No. PCT/US2017/045127 (dated Nov. 23, 2017).

Korean Intellectual Property Office, Written Opinion of the International Searching Authority in Application No. PCT/US2017/045127 (dated Nov. 23, 2017).

* cited by examiner

FIG. 3

SYSTEM AND METHOD FOR COLLECTING, CONSOLIDATING AND PROCESSING DATA

FIELD

The present disclosure provides a system and method for collecting, consolidating and processing data, and more particularly, to a system and method for mapping, validating and consolidating the data, creating and reusing the rules made up of data attributes, conditions, operators etc., also known as calculations or formula, which in combination create rules, and generating final reports in a distributed processing environment. A distributed processing environment can be an environment consisting of a single computer or multiple computers running multiple cores and threads, being able to execute multiple instructions concurrently.

BACKGROUND

Regulated enterprises are required to submit numerous reports in government defined formats at defined intervals. The reports are generated based on individual transactions which happen during the period and the rules governing those reports are made based on guidelines of the regulators. An exemplary embodiment of a regulated enterprise used in this disclosure is banks. Banks are spread across regions and may have multiple subsidiary banks. The individual transactions are recorded in disparate data formats by different subsidiary banks, or subsidiaries of any regulated enterprise in question. The volume of the data can to be huge, in the multi-terabyte range, however is not limited thereto. Typically, the data is brought at one place and then crunched. The data, small in volume or large, that is generated pertains to millions of transactions. The data includes a plurality of data sources belonging to a plurality of data formats that are integrated in a globalized environment. Therefore, using the conventional technology, copying the transaction data, if copied over the internet, from one hard disk to another hard disk would take days. The reports thus generated lack accountability to the end transaction because the prior art systems for collecting, consolidating and processing data in a distributed processing environment are not configured to flag and inform changes in values that are obtained from these reports. Therefore, the prior art systems are not configured and enabled to backtrack from a computed report field down to an individual transaction.

Further, the rules for mapping configuration and/or standardization of data are set and/or change within the distributed processing environment in prior art systems.

What is needed is a system and method for collecting, consolidating and processing data that is configured to retrieve the data aggregation chain from the final report field to individual data items that contributed in the calculation of the field and having the ability to backtrack from a computed report field down to an individual transaction.

Further, what is needed a system and method for collecting, consolidating and processing data consistently in a distributed processing environment wherein the changes to the standardization rules and rules for mapping configuration are defined outside distributed processing environment.

Further, what is needed is a system and method of cross referencing computed data in a distributed processing environment wherein a computed value computed for one report can be referenced in other reports.

SUMMARY

A system for collecting, consolidating and processing data, the method is described. The system includes an ephemeral database implementation that is programmed and configured to advantageously facilitate and allow storing of data in a row/column format and a security service that is programmed and configured to facilitate user authentication using and resolution of user rights. The system further has a system manager that is programmed and configured to advantageously facilitate the initiation or start of a data validation and standardization when a data stream is specified by the user, and a data validator and standardizer that is programmed and configured to read a plurality of specified data streams and validate the data streams against pre-defined constraints and migrate standardized data to the an ephemeral database. The system includes a formula provider that is programmed and configured to facilitate provision of a mathematical expressions which are required to compute a particular item in a final report that is generated by the system. The system has calculation engine that is programmed and configured outside the distributed processing environment to receive customized requirements for a pre-defined job specification having pre-defined and customized fields as per the in the report provided by the formula provider and process the requirement using distributed processing environment, the calculation engine is further configured to receive and process a plurality of report templates that are configured outside the distributed processing environment. The system includes a report generator that is programmed and configured to advantageously utilize output from the calculation engine and generates the reports as specified in the report templates.

Accordingly, the present disclosure provides a system and method for collecting, consolidating and processing data. The method includes creating a multi-tenant cloud service, wherein a plurality of users from multiple organizations are capable of submitting data via one or multiple physical and/or transient data streams to the multi-tenant cloud service. The multi-tenant cloud service and processes the data independently and independently and/or in an aggregated formats and securely. The method further includes creating a standardized data format to aggregate the data received from various data streams. The method furthermore includes implementing an ingress system, wherein the ingress system is capable of allowing the users to upload or specify submit the data streams in various formats. Moreover, the method includes providing data validation for the input data, wherein the ingress system flags errors for unacceptable incorrect/inconsistent data.

Also, the method includes providing data transformations for the input data, wherein the ingress system transforms the data into standardized data formats.

Thereafter, the method includes allowing the users to specify the type of reports to be generated, and creating global report templates, wherein the reports are configurable for both computation and presentation, and wherein the reports are capable of being changed without making code changes; These global templates will be created to satisfy to the required format of the report.

Further, the method includes processing transactional data for reporting and allowing users to generate and view available reports via an internet computation service.

Furthermore, the process includes providing an approval and signoff workflow process way for users to submit reports to supervisor the management and supervisory hierarchy as required by the organization for approval and sign off.

The method includes allowing the user to access the generated report download approved report so that it can be submitted to regulatory authorities electronically or in physical form.

According to an aspect of another exemplary embodiment, a method for collecting, consolidating and processing data is provided. The method includes receiving, using at least one of said at least one processor, data via a plurality of data streams, aggregating, using at least one of said at least one processor, data received via the plurality of data streams, validating, using at least one of said at least one processor, the received data, and transforming, using at least one of said at least one processor, the received data into standardized data formats.

According to another exemplary embodiment, the method further includes receiving, using at least one of said at least one processor, specific requirements for a particular report job, processing, using at least one of said at least one processor, the received specific requirements, and creating, using at least one of said at least one processor, global report templates based on the processing.

According to another exemplary embodiment, the method of claim 8, wherein the global report templates and rules are reusable and configurable for both computation and presentation, and wherein the global report templates are capable of being changed without making code changes.

According to another exemplary embodiment, the method further includes processing, using at least one of said at least one processor, transactional data, receiving, using at least one of said at least one processor, user input regarding report generation, and generating, using at least one of said at least one processor, a report using the global report template based on the received user input regarding report generation According to another exemplary embodiment, the method further includes receiving, using at least one of said at least one processor, user input regarding approval process, and providing, using at least one of said at least one processor, electronic access to the generated report to at least one user based on the received input regarding approval process.

According to another exemplary embodiment, the method further includes providing, using at least one of said at least one processor, electronic access to the generated reports.

According to an aspect of another exemplary embodiment, a method for collecting, consolidating and processing data, using at least one processor, includes receiving, using at least one of said at least one processor, data via a plurality of data streams, aggregating, using at least one of said at least one processor, data received via the plurality of data streams, validating, using at least one of said at least one processor, the received data, transforming, using at least one of said at least one processor, the received data into standardized data formats, receiving, using at least one of said at least one processor, specific requirements for a particular report job, processing, using at least one of said at least one processor, the received specific requirements, retrieving, using at least one of said at least one processor, previously created rules for report generation, and creating, using at least one of said at least one processor, global report templates using the retrieved rules.

According to another exemplary embodiment, the method further includes creating, using at least one of said at least one processor, new rules based on the processes received specific requirements and the retrieved rules, and saving, using at least one of said at least one processor, the created new rules.

BRIEF DESCRIPTION OF THE DRAWINGS

The accompanying drawings, which are incorporated in and constitute a part of this specification, exemplify the embodiments of the present disclosure and, together with the description, serve to explain and illustrate principles of the disclosure. The drawings are intended to illustrate major features of the exemplary embodiments in a diagrammatic manner. The drawings are not intended to depict every feature of actual embodiments nor relative dimensions of the depicted elements, and are not drawn to scale.

FIG. 2 illustrates a flowchart that represents a method for collecting, consolidating and processing data, according to an exemplary embodiment; and.

Figure 3:
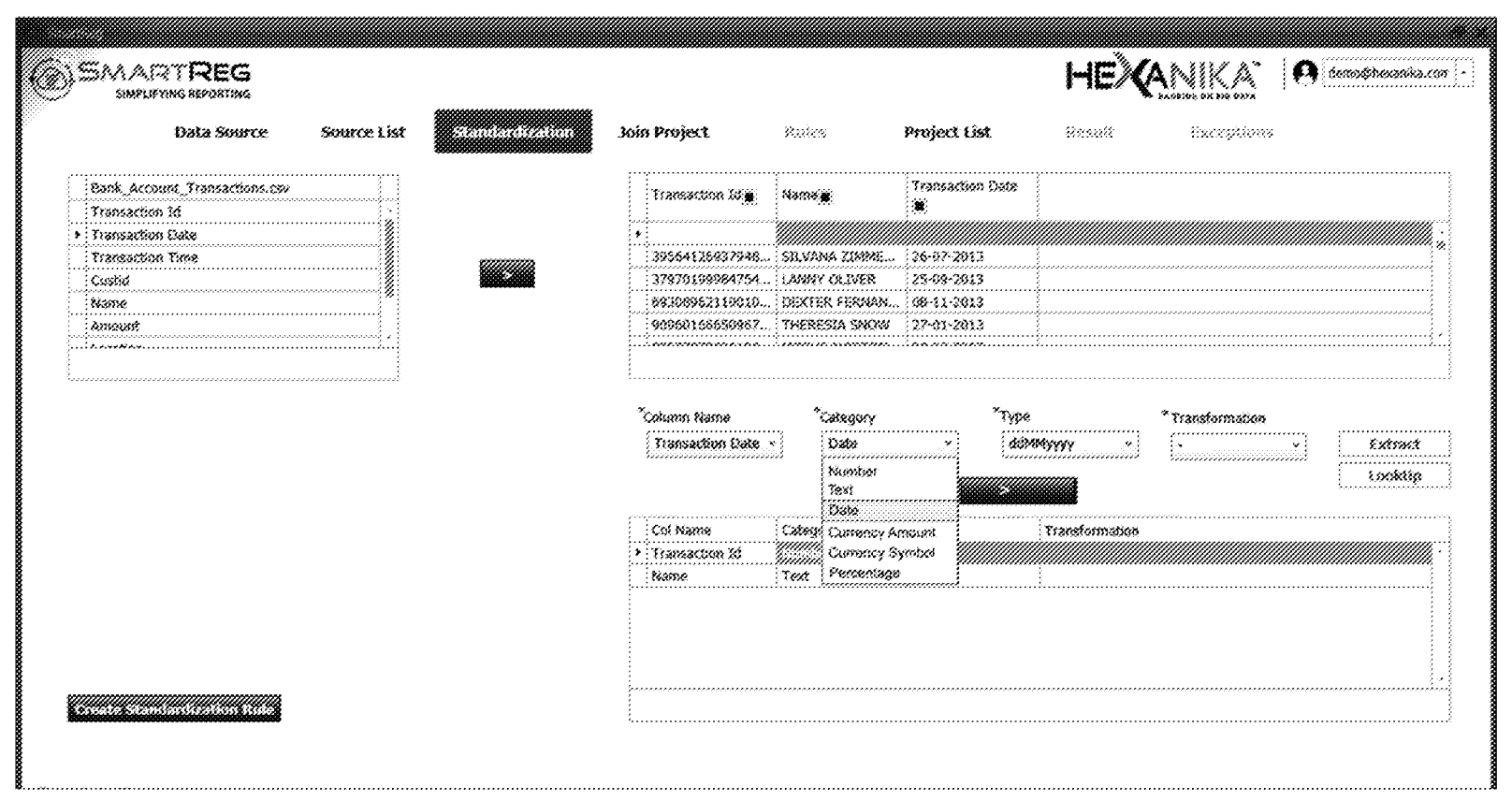

FIG. 3 illustrates an exemplary embodiment of a user interface to provide standardization of the received data.

Figure 1:
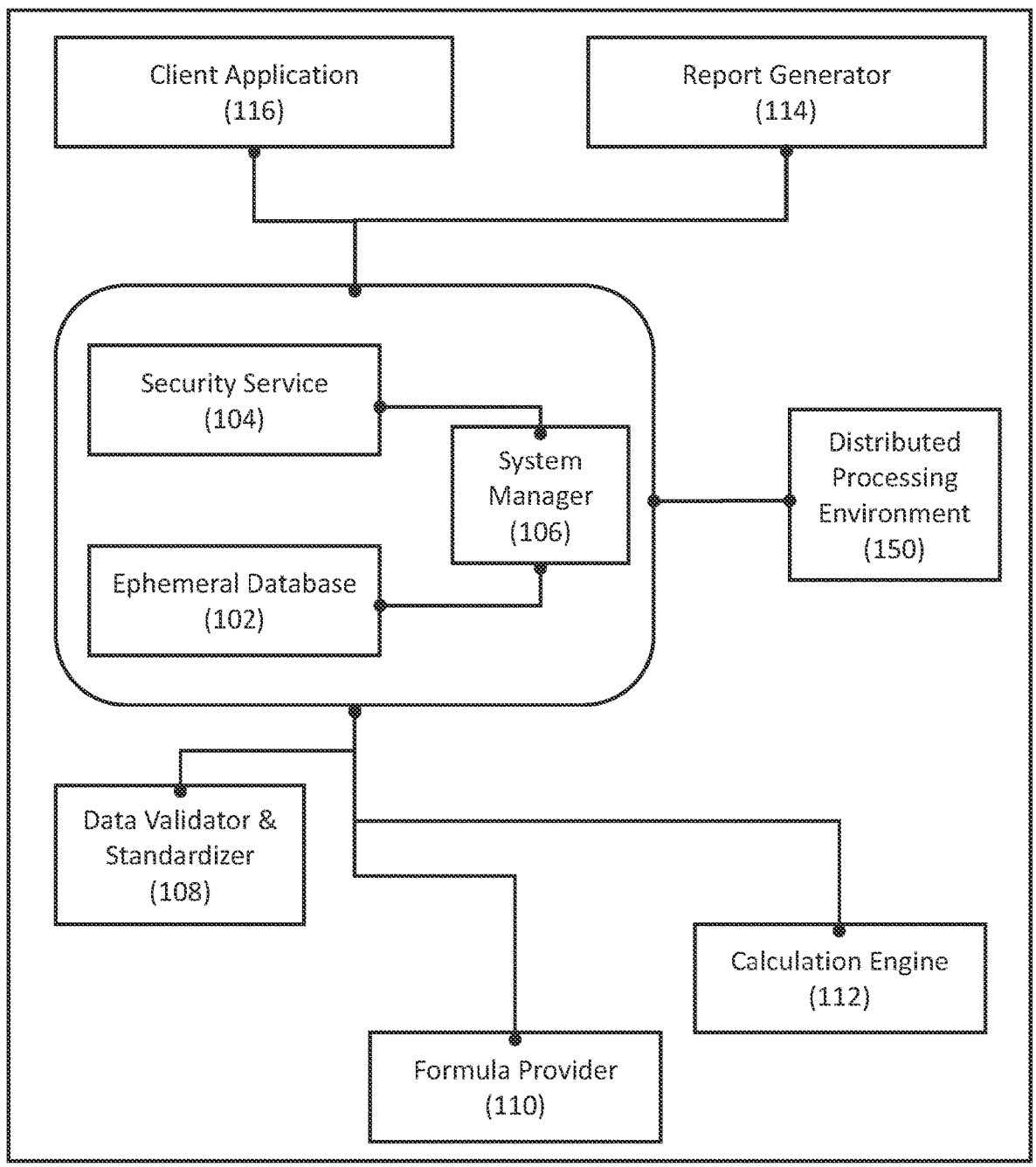
FIG. 1 illustrates an architecture of a system and method for collecting, consolidating and processing data, according to an exemplary embodiment.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced.

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION

Various examples of the disclosure will now be described. The following description provides specific details for a thorough understanding and enabling description of these examples. One skilled in the relevant art will understand, however, that the disclosure may be practiced without many of these details. Likewise, one skilled in the relevant art will also understand that the disclosure can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the disclosure. Indeed, certain terms may even be emphasized below; however, any terminology intended to be interpreted in any restricted manner will be overtly and specifically defined as such in this Detailed Description section.

While this specification contains many specific implementation details, these should not be construed as limitations on the scope of any disclosure or of what may be claimed, but rather as descriptions of features specific to particular implementations of particular disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Referring to FIG. 1, an architecture of a system and method for collecting, consolidating and processing data 100, according to an exemplary embodiment, includes the ephemeral database 102 that advantageously facilitates and allows storing of data in a row/column format. The system and method in accordance with the present disclosure is preferably implemented in a distributed processing environment 150. The ephemeral database 102 is a database implementation based on the file system available in the distributed processing environment 150 and as required and/or suitable, a supplementary database system available for storing metadata.

The system and method for collecting, consolidating and processing data 100 in accordance with the present disclosure further includes a Security Service 104 that facilitates User Authentication using User IDs and Passwords. The Security Service 104 also facilitates Resolution of User Rights that includes providing access to various data and activities. The system and method 100 in accordance with the present disclosure further includes a System Manager 106 that advantageously facilitates and orchestrates the system 100 work flows and data flows. The work flow and data flow activities includes, for example, the initiation or start of a data validation and standardization when a file is uploaded by a user.

The data validation and standardization of the system 100 is performed by a Data Validator and Standardizer 108. The Data Validator and Standardizer 108 of the system 100 is advantageously enabled to read the uploaded files or read data from data streams. The Data Validator and Standardizer 108 validates files against pre-defined constraints and migrates the Data to the ephemeral database 102. The Data Validator and Standardizer 106 further ensures that the data that is migrated to ephemeral database 102 is standardized and rejects invalid data.

The system and method for collecting, consolidating and processing data 100 further includes a Formula Provider 110 that facilitates provision of a mathematical expressions that are required to compute a particular item in a final report that is generated by the system 100. The Formula Provider 110 works and provides the mathematical expressions outside the distributed processing environment 150.

The system and method for collecting, consolidating and processing data 100 has a Calculation Engine 112 that is advantageously enabled to receive to specific and/or customized requirements for a pre-defined and/or customized job specification, which includes pre-defined and/or customized fields, in the report provided by the Formula Provider 110 and processes the requirement using distributed processing environment 150. The pre-defined and/or customized job specification is, therefore, is performed in accordance with a report template. A plurality of report templates are made available to the system 100 and appropriate report template is selected by the Calculation Engine 112. The Calculation Engine 112, however, works outside the distributed processing environment 150.

The system and method for collecting, consolidating and processing data 100 further includes a Report Generator 114 that is enabled to advantageously utilize output from the Calculation Engine 112 and generates the reports as specified in the report template. The system and method for collecting, consolidating and processing data 100 further includes a Client Application 116 that is enabled to advantageously present the report generated by the Report Generator 114.

The Ephemeral Data Storage 102, the Security Service 104, the System Manager 106 are set of programs and services that form the core components of the system 100. The Data Validator and Standardizer 108, the Formula Provider 110, the Calculation Engine 112, the Report Generator 114 and the Client Application 116 are necessary programs and applications that work with the core components of the system. The Data Validator & Standardizer 108, The Calculation Engine 112 and the Formula Provider 110, in particular, are configured to advantageously allow the ephemeral database 102, to be configured from outside.

The reports thus generated provide accountability to the end transaction because the system and method for collecting, consolidating and processing data in accordance with the present disclosure is configured to flag and inform changes in values that are obtained from these reports, and, therefore, enabled to backtrack from a computed report field down to an individual transaction.

The system and method in accordance with the present disclosure is configured to retrieve the data aggregation chain from the final report field to individual data items that contributed in the calculation of the field and having the ability to backtrack from a computed report field down to an individual transaction. Further, the rules for mapping configuration and/or standardization of date are set and/or change within the distributed processing environment in prior art systems.

The system and method of the present disclosure provides support for growing challenges of managing data. The system uses a cloud-based regulatory reporting application, however use of the cloud-based aspect is not limited thereto and all data may be stored on premises. The system is designed to produce regulatory reports which comply with requirements mandated by various government and/or private organizations. Because of flexible architecture of the present disclosure, the system and method can be scaled to support other reporting templates with a relatively small incremental effort.

Figure 2:
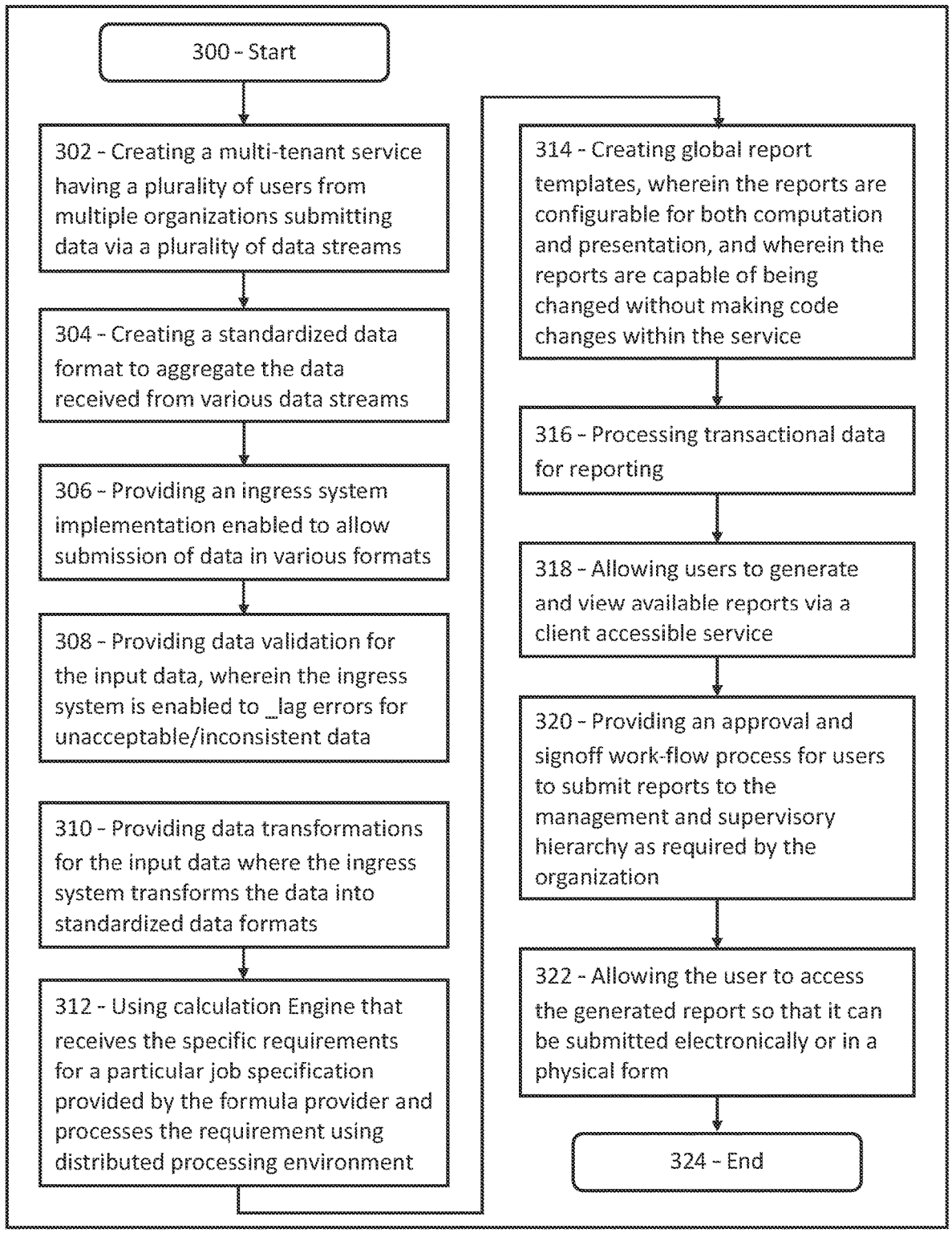
Figure 4:
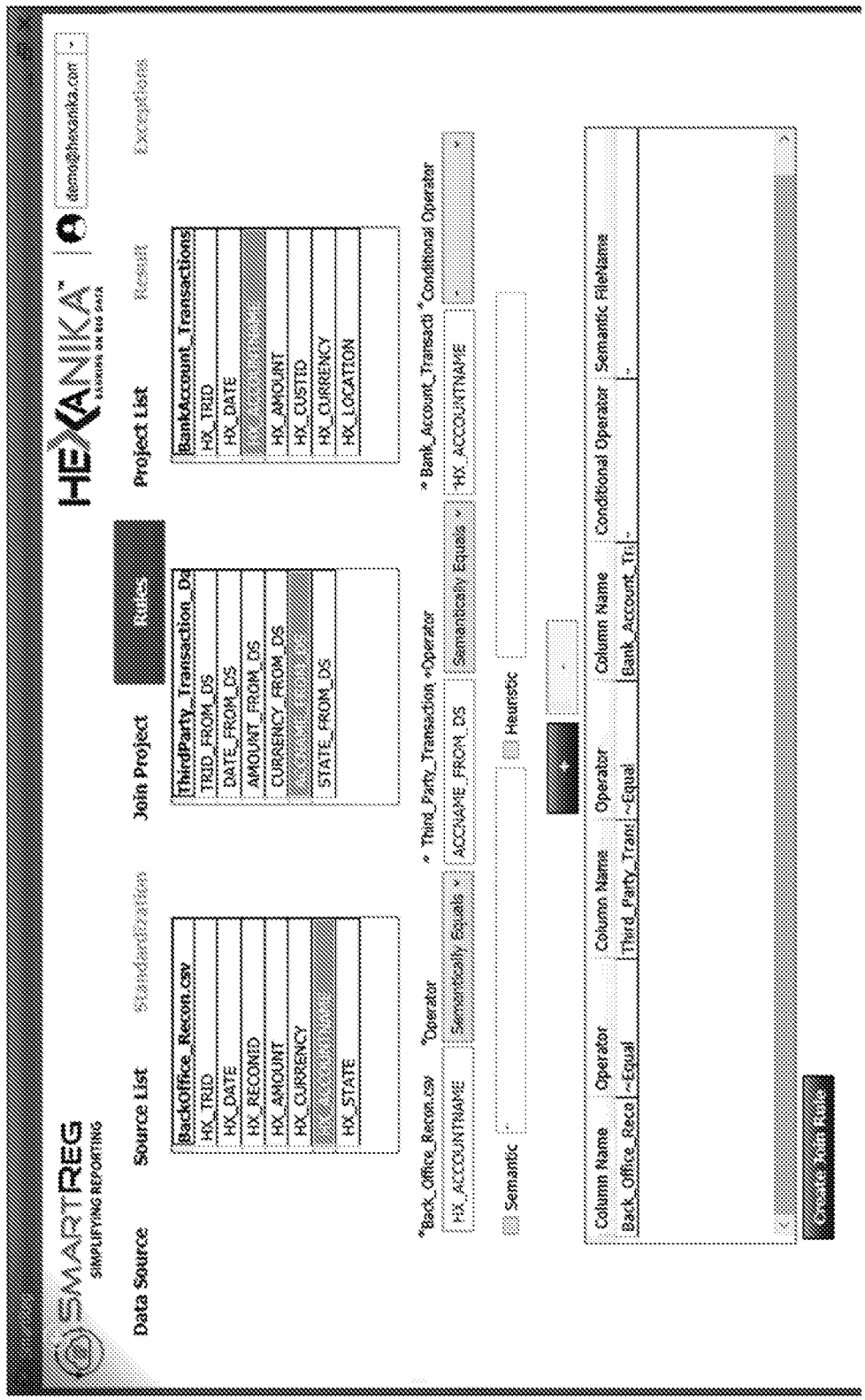
FIG. 4 illustrates an exemplary embodiment of a user interface providing rules to be applied to the standardized data.
Figure 5:
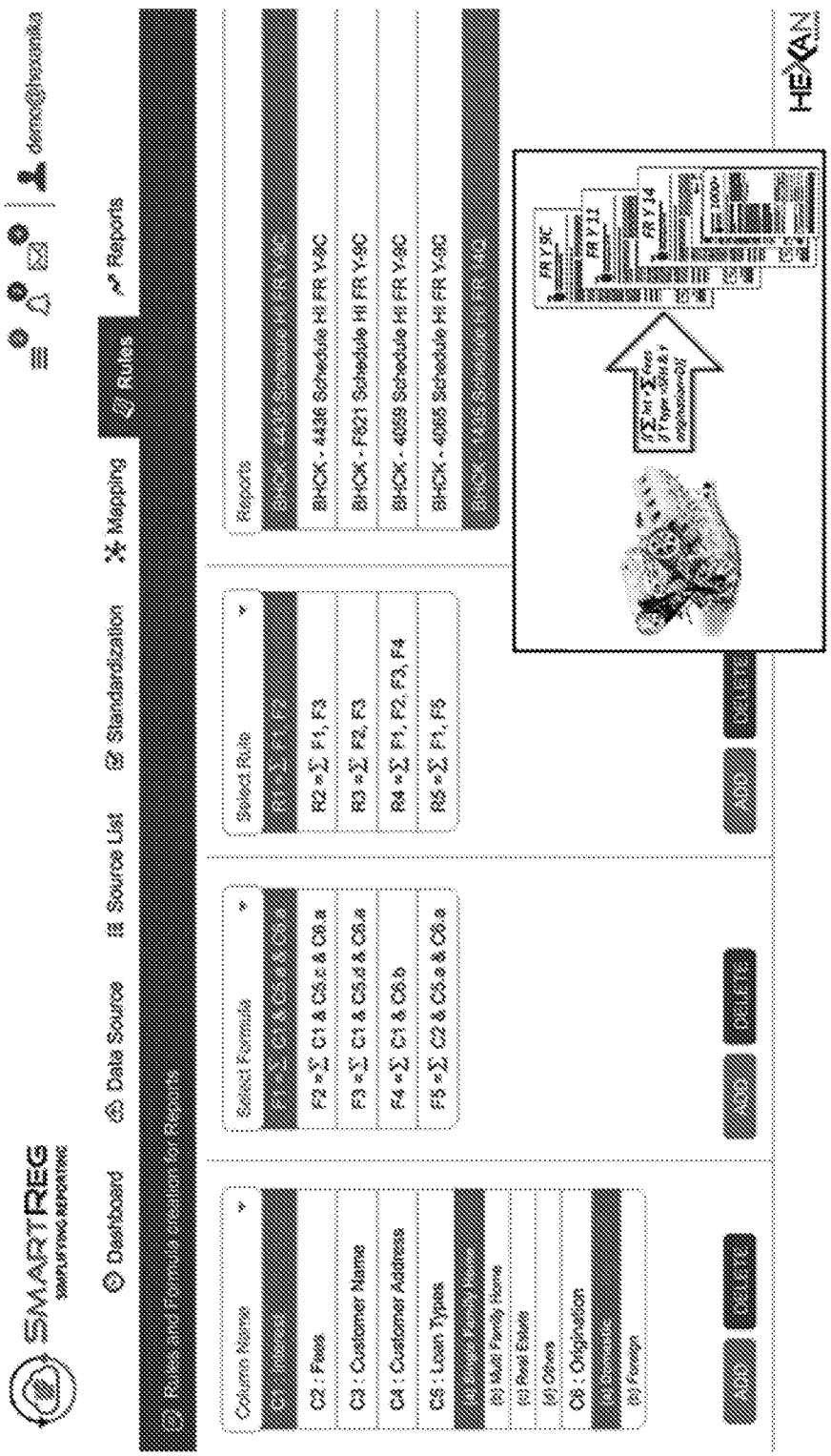
FIG. 5 illustrates another exemplary embodiment of a user interface providing rules to be applied to the standardized data.
Figure 6:
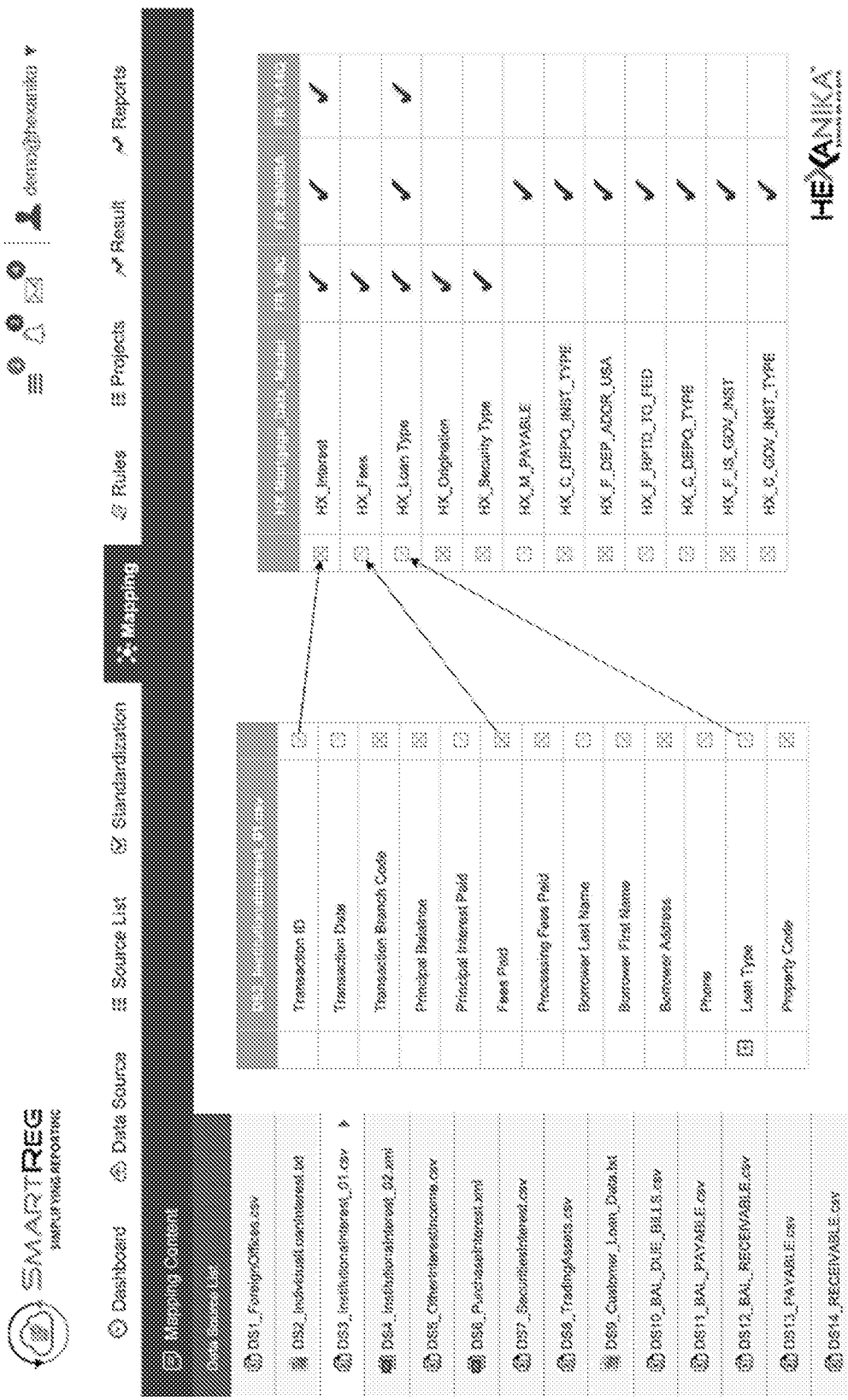
FIG. 6 illustrates an exemplary embodiment of a user interface providing mapping tools to applied to the standardized data.

Referring to FIG. 2, a method for collecting, consolidating and processing data in accordance with the present disclosure is explained in detail. The method starts at step 300 and moves to step 302. At step 302, a multi-tenant cloud service, wherein a plurality of users from multiple organizations are capable of submitting data via one or multiple physical and/or transient data streams and processing the data independently and/or in an aggregated formats, is created and the process moves to step 304.

At step 304, the method in accordance with present disclosure creates standardized data format to aggregate data received from a plurality of disparate data streams and moves to step 306. The standardized data format includes the essential data and metadata required to generate the reports. The data format is technology agnostic and can be transferred to any logical database service. The ephemeral database 102 is configured and to store root level data elements which can be used in further calculations to generate the required output.

At step 306, the method in accordance with present disclosure implements an ingress system that is capable of allowing the users to submit the data in various formats, and moves to step 308. The ingress system uses a web application 125 running on a secure http protocol (https) with certificate authentication. The ingress system is guarded by a strong security policy. The ingress system allows the user to define the rules and computation required for the user data to be stored in the standardized format. The ingress system also allows the user to upload a persisted file in a CSV format and submits the file for further validations, transformations and processing. The use of the CSV format is merely exemplary, and any format, know to one of ordinary skill in the art, may be used.

At step 308, the method in accordance with present disclosure provides data validation for the input data, wherein the ingress system flag errors for unacceptable/inconsistent data and moves to point step 310. In an embodiment, the ingress system has a set of configurable validation rule definitions. These validation rule definitions are according to the structure of the incoming data. The ingress system validates all incoming data to satisfy the conditions specified in the validation rule definitions.

The rules for validating the data are stored in a standard XML format outside the distributed processing environment 150. The use of XML format is not limited thereto and any other format, known to one of ordinary skill in the art, such as, for example TXT, JSON may be used. These rules are per tenant, and per file format. These rules are parsed at runtime, a parse tree is created in the memory and the incoming data is validated against these rules.

Example

The incoming data has three fields, DATE, AMOUNT, and ACCOUNT NO

The standard data format requires that the amount should be positive so the rule is Indicative Example

```
<VALIDATION_RULE>
<FIELD>AMOUNT<FIELD>
<EVALUATION>GT.0</EVLUATION>
</VALIDATION_RULE>
```

At step 310, the method in accordance with present disclosure provides data transformations for the input data, where the ingress system transforms the data into standardized data formats, and moves to point A at step 312. In an embodiment, the ingress system includes transformation rule definitions. The ingress system transforms all incoming data to as specified in the validation rule definitions.

The formulas transforming the data are preferably stored in a standard XML format and stored outside the distributed processing environment 150. However, other file formats, such as, for example TXT, JSON may be used. These transformations are per tenant, and per file format. These formulas are parsed at runtime, a parse tree is created in memory and the incoming data is transformed so that it conforms to the standardized data format.

Example

The incoming data has three fields, DATE, AMOUNT, and ACCOUNT NO

The standard data format requires that the date should be in yyyy/MM/dd format, but the incoming data has it in MM/dd/yyyy format. For this case the transformation will be Indicative Example

```
<TRANSFORM>
<FIELD TYPE="DATE">TRANSACION_DATE<FIELD>
<FORMAT_IN>MM/dd/yy</FORMAT_IN >
<FORMAT_OUT>yyyy/MM/dd</FORMAT_OUT>
</TRANSFORM>
```

The method resumes at point A and moves to step 314. At step 314, the method in accordance with present disclosure creates global report templates, wherein the reports and rules, rules being a combination of conditions, operators and data elements, are configurable for both computation and presentation and moves to step 316. The reports are capable of being changed without making code changes. These global templates are created to satisfy to the required format of the report. The reports thus created can be used for regulatory reporting, management reporting, risk reporting, and any other form of reporting required in a regulated enterprise. Therefore, financial institutions, healthcare institutions and other institutions may be able to meet there reporting requirements much more efficiently.

The definitions for the global templates are preferably stored in a standard XML format and outside the distributed processing environment 150. However, other file formats, such as, for example TXT, JSON may be used. These definitions are constant for a particular template and are based upon the requirements of the final report. These definitions are parsed at runtime, a parse tree is created in memory and the incoming data is aggregated, processed as defined.

Indicative Example

The report requires the sum of all Interests payments made by Credit Card holders. The standard data format will have the relevant columns DATE, INTEREST_AMOUNT, ACCOUNT_TYPE (where ACCOUNT_TYPE=12 means Credit Card)

For computation of the final report, the formula will be

```
<FINAL_REPORT_INTEREST_CRCARD>
<FIELD> INTEREST_AMOUNT<FIELD>
```

-continued

```
<FORMULA>SUM(INTEREST_AMOUNT):
ACCOUNT_TYPE.EQ.12</FORMAT_IN >
    <FORMAT_OUT>yyy/MM/dd</FORMAT_OUT>
    </FINAL_REPORT_INTEREST_CRCARD>.
```

At step 316, the method in accordance with present disclosure processes transactional data for reporting and moves to step 318. The system has a configurable mathematical formulae and aggregation methods so that the report are computed using the standardized data. The computation process uses one or more logical computing units or one and more ephemeral database 102 systems in sequentially or in parallel.

Some reports require further computations for statistical and mathematical purposes.

At step 318, the method in accordance with present disclosure allows the users to generate and view available reports via an internet computation service and the process moves to step 320. Such a service is manifested as a Web Service or a Web Portal. The web service serves as the user interaction point and uses the computational formulas to compute the results and populate the user interface elements accordingly.

At step 320, the method in accordance with present disclosure provides an approval and signoff workflow process for users to submit reports to the management and supervisory hierarchy as required by the organization and moves to step 322. Once a report is created using the above mechanism, the report can be sent for approval or rejection through a hierarchical chain. During the approval process the report may be sent back for resolving outlier data elements.

At step 322, the method in accordance with present disclosure allowing the user to access the generated report so that it can be submitted electronically or in physical form and the method then terminates at step 324. These reports have to be submitted to various authorities and these submission points accept different data formats, like physical paper, Microsoft Excel format, PDF or direct online-stream-uploading. The system allows create the reports in the formats as required by the relevant authority.

The rules and report modeling, as described above, provides a cascading impact, in-turn empowering scalability and reusability across different reports and regulations globally, providing flexibility which enables easy maintenance without editing source code, enforcing consistency in reports as same rules are re-used minimizing possibility for error, making the report creation process much more efficient, identifying as well as providing view of redundancies in regulations and/or other use cases, and providing end to end view of the report, transformation and source data.

FIGS. 3-6 depict user interfaces for standardizing date inputs, mapping inputs and rules to be applied to the standardized data, according to an exemplary embodiment.

Figure 7:
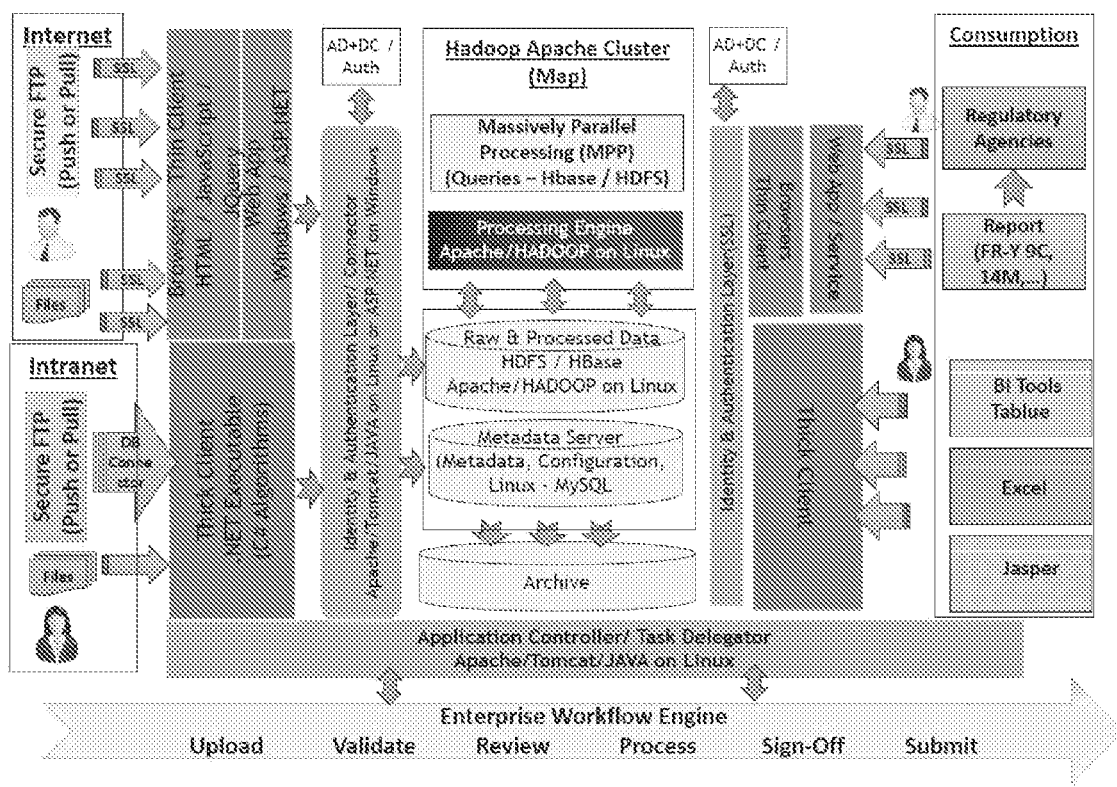
FIG. 7 illustrates a block diagram depicting a top level architecture using Hadoop Apache Cluster, according to an exemplary embodiment.

According to an exemplary embodiment, Hadoop on Apache installed on a Linux system augmented with Java runtime is used as the distributed processing environment. HDFS, which is the Hadoop's file system and its derivative HBASE in combination with an open source database MySQL is used as the ephemeral database. Further a browser based web application with C# and ASP.NET and Microsoft SQL Server are used as the database for storing login credentials for a plurality of users in a plurality of tenants, and allows multiple concurrent sessions for a plurality of users in the respective tenant realms. An exemplary embodiment of using Hadoop Apache Cluster is depicted in FIG. 7.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The various methods and techniques described above provide a number of ways to carry out the disclosure. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method for collecting, consolidating and processing data, the method comprising:
   creating a multi-tenant cloud service, wherein a plurality of users from multiple organizations are capable of submitting data via one or multiple physical and/or transient data streams to the multi-tenant cloud service, the multi-tenant cloud service processes the data independently and/or in an aggregated formats;
   creating a standardized data format to aggregate the data received from various data streams;
   implementing an ingress system, the ingress system capable of allowing the users to submit the data in various formats;
   providing data validation for the input data, wherein the ingress system flag errors for unacceptable/inconsistent data;
   providing data transformations for the input data, where the ingress system transforms the data into standardized data formats;
   creating global report templates, wherein the reports are configurable for both computation and presentation, and wherein the reports are capable of being changed without making code changes;
   processing transactional data for reporting;
   allowing users to generate and view available reports via an internet computation service;
   providing an approval and signoff workflow process for users to submit reports to the management and supervisory hierarchy as required by the organization; and
   allowing the user to access the generated report so that it can be submitted electronically or in physical form.

2. The method of claim 1, wherein the plurality of users are capable of being uploading and processing data in the multi-tenant service independently.

3. The method of claim 1, wherein the data can be submitted using various data formats, persisted and/or transient.

4. The method of claim 1, wherein all organizations are being capable of uploading data using more than one format.

5. A system for collecting, consolidating and processing data, the method comprising:
   an ephemeral database service that is programmed and configured to advantageously facilitate and allow storing of data in a row/column format; a security service that is programmed and configured to facilitates user authentication using and resolution of user rights; a system manager that is programmed and configured to advantageously facilitate the initiation or start of a data validation and standardization when a file is uploaded by a user; a data validator and standardizer that is programmed and configured to read a plurality of uploaded files and validate the files against pre-defined constraints and migrate standardized data to the ephemeral database; a formula provider that is programmed and configured to facilitates provision of a mathematical expression that is required to compute a particular item in a final report that is generated by the system;
   a calculation engine that is programmed and configured outside the distributed processing environment to receive customized requirements for a pre-defined job specification having pre-defined and customized fields as per the in the report provided by the formula provider and process the requirement using distributed processing environment, the calculation engine is further configured to receive and process a plurality of report templates that are configured outside the distributed processing environment; and
   a report generator that is programmed and configured to advantageously utilize output from the calculation engine and generates the reports as specified in the report templates.

6. A method for collecting, consolidating and processing data, the method comprising:
   providing an ephemeral database service that is programmed and configured to advantageously facilitate and allow storing of data in a row/column format; providing a security service that is programmed and configured to facilitates user authentication using and resolution of user rights; providing a system manager that is programmed and configured to advantageously facilitate the initiation or start of a data validation and standardization when a file is uploaded by a user; providing a data validator and standardizer that is programmed and configured to read a plurality of uploaded files and validate the files against pre-defined constraints and migrate standardized data to the ephemeral database; providing a formula provider that is programmed and configured to facilitates provision of a mathematical expression that is required to compute a particular item in a final report that is generated by the system;
   providing a calculation engine that is programmed and configured outside the distributed processing environment to receive customized requirements for a pre-defined job specification having pre-defined and customized fields as per the report provided by the formula provider and process the requirement using distributed processing environment, the calculation engine is further configured to receive and process a plurality of report templates that are configured outside the distributed processing environment; and
   providing a report generator that is programmed and configured to advantageously utilize output from the calculation engine and generates the reports as specified in the report templates.

7. A method for collecting, consolidating and processing data, using at least one processor, the method comprising:
   receiving, using at least one of said at least one processor, data via a plurality of data streams, wherein the data comprises a plurality of different data formats;
   aggregating, using at least one of said at least one processor, the data received via the plurality of data streams;
   validating, using at least one of said at least one processor, the received data against pre-defined constraints to determine that a portion of the data received via the plurality of data streams does not conform to the pre-defined constraints; and transforming, using at least one of said at least one processor, the portion of the data received via the plurality of data streams that does not conform to the pre-defined constraints into standardized data formats.

8. The method of claim 7, further comprising:

receiving, using at least one of said at least one processor, specific requirements for a particular report job;

processing, using at least one of said at least one processor, the received specific requirements; and creating, using at least one of said at least one processor, global report templates based on the processing.

9. The method of claim 8, wherein the global report templates and rules are reusable and configurable for both computation and presentation, and wherein the global report templates are capable of being changed without making code changes.

10. The method of claim 8, further comprising:

processing, using at least one of said at least one processor, transactional data;

receiving, using at least one of said at least one processor, user input regarding report generation; and generating, using at least one of said at least one processor, a report using the global report template based on the received user input regarding report generation.

11. The method of claim 10, further comprising:

receiving, using at least one of said at least one processor, user input regarding approval process; and providing, using at least one of said at least one processor, electronic access to the generated report to at least one user based on the received input regarding approval process.

12. The method of claim 10, further comprising:

providing, using at least one of said at least one processor, electronic access to the generated reports.

13. A method for collecting, consolidating and processing data, using at least one processor, the method comprising:

receiving, using at least one of said at least one processor, data via a plurality of data streams, wherein the data comprises a plurality of different data formats;

aggregating, using at least one of said at least one processor, data received via the plurality of data streams;

validating, using at least one of said at least one processor, the received data against pre-defined constraints to determine that a portion of the data received via the plurality of data streams does not conform to the pre-defined constraints;

transforming, using at least one of said at least one processor, the portion of the data received via the plurality of data streams that does not conform to the pre-defined constraints into standardized data formats;

receiving, using at least one of said at least one processor, specific requirements for a particular report job;

processing, using at least one of said at least one processor, the received specific requirements;

retrieving, using at least one of said at least one processor, previously created rules for report generation; and creating, using at least one of said at least one processor, global report templates using the retrieved rules.

14. The method of claim 13, further comprising:

creating, using at least one of said at least one processor, new rules based on the processes received specific requirements and the retrieved rules; and saving, using at least one of said at least one processor, the created new rules.

* * * * *